S. J. BROWN.
WEED ATTACHMENT FOR FISH LURES.
APPLICATION FILED AUG. 18, 1920.
1,371,348.
Patented Mar. 15, 1921.
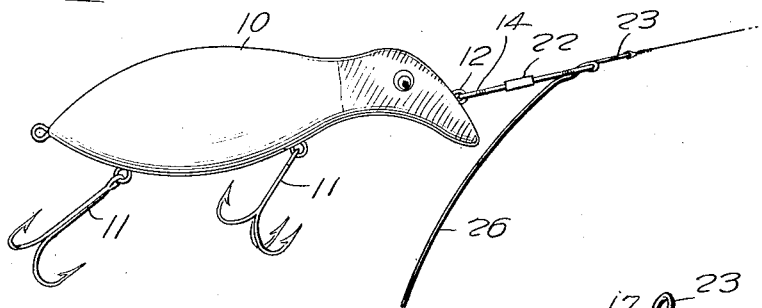
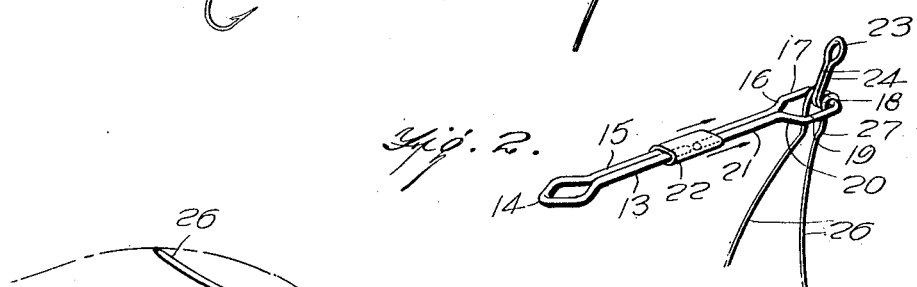
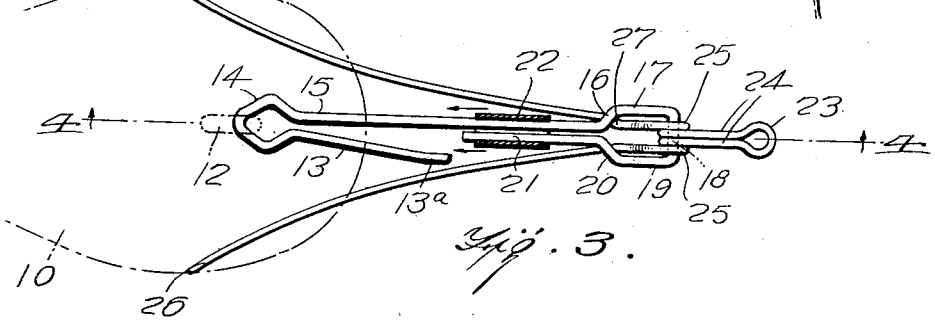
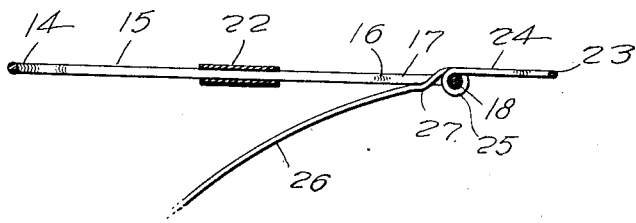
INVENTOR.
SAMUEL J. BROWN,
BY
Watson E. Coleman
ATTORNEY.

UNITED STATES PATENT OFFICE.

SAMUEL J. BROWN, OF OSAKIS, MINNESOTA.

WEED ATTACHMENT FOR FISH-LURES.

1,371,348.

Specification of Letters Patent.   Patented Mar. 15, 1921.

Application filed August 18, 1920. Serial No. 404,368.

*To all whom it may concern:*

Be it known that I, SAMUEL J. BROWN, a citizen of the United States, residing at Osakis, in the county of Douglas and State of Minnesota, have invented certain new and useful Improvements in Weed Attachments for Fish-Lures, of which the following is a specification, reference being had to the accompanying drawings.

This invention relates to weed attachments for fish lures.

An important object of the invention is to provide a weed attachment for lures which may be readily attached to and detached from fish lures at present in common use.

A further object is to provide a device of this character which may be attached to the lure without the assistance of tools. Weed attachments are not necessary and are more or less in the way when employed in water free from weeds and similar obstructions, and it is accordingly not desirous that the weed attachment be permanently secured to the body of the lure. Often in fishing, the fisherman will encounter a good stretch of clear water where the weed attachment is not necessary, and subsequently encounter a patch of weeds and grass when the weed attachment becomes necessary. It will therefore be seen that a weed attachment which is readily attachable to and detachable from the lure, and which is free from permanent connection when attached which will not necessitate the use of tools to detach therefrom, becomes a decided advantage.

A further object of the invention is to provide a weed attachment of the character described which will effectually prevent engagement of the hooks upon the body of the lure by weeds when the lure is moving toward or to one side of the fisherman.

Other objects and advantages of the invention will become apparent throughout the course of the following description.

In the accompanying drawings wherein for the purpose of illustration is shown a preferred embodiment of my invention and wherein like reference characters designate like parts thereof:

Figure 1 is a side elevation of a fish lure equipped with my weed attachment.

Fig. 2 is a perspective view of my weed attachment.

Fig. 3 is a plan view thereof, and

Fig. 4 is a section on the line 4—4 of Fig. 3.

Referring now more particularly to the drawings, the numeral 10 designates a lure of any preferred type. These lures are provided upon the under surface thereof with a plurality of hooks 11 usually in the form of gang hooks, which consist of a plurality of single hooks connected together having the hook portions thereof radially disposed and which hooks are provided with a common attaching eye. These hooks, as is obvious to those familiar with the art, presenting so much surface, readily engage weeds when passing therethrough. The lures are provided at their forward or head ends with an attaching eye 12 by means of which the casting line is usually attached thereto.

My invention consists in a device adapted to be removably connected in the eye 12 and provided with means for the attachment of a casting line thereto, and likewise provided with weed prongs 26 extending downwardly below the plane of the lure body to prevent the engagement of weeds with the hooks 11. In the present instance this device is shown as comprising a wire 15 provided with offset bends as at 14 forming an attaching eye. These bends are formed adjacent one end of the wire and the end of the wire 13 beyond the loops is brought back substantially parallel the wire 15 and spaced a short distance therefrom. This end of the wire is however, given a slight curvature as at 13ª which curvature is retained by reason of the fact that the wire 15 is resilient.

The opposite end of the wire 15 is provided with an offset bend 16 terminating in a forwardly extending portion 17. The wire is bent transversely with relation to the body 15 of the wire at the forward end of the portion 17, forming a weed prong attaching bar 18. This weed prong attaching bar 18 is provided at its opposite end with a portion 19 parallel to portion 17 and having at its rear end an inset portion 20 forming a shoulder in juxtaposition to the shoulder 16. This end 21 of the wire is then extended parallel to the body portion 15. It will be seen that this attaching member consists of a pair of slightly spaced central portions, one of which is formed of two sections, the central portions being provided at their ends with offset bends one set of bends forming an attaching loop and the other set of bends providing an attaching bar and a pair of shoulders spaced inwardly from the attaching bar. A keeper 22 is slidably mounted upon the central portions and is of such length that it may be entirely disposed upon the wire 15 and the end 21 thereof. This keeper when in this position permits the curved end 13^A to spring outwardly thereby permitting the insertion of this end in the attaching eye 12 of the lure 10 so as to bring this eye 12 into engagement in the eye 14 of the attaching member. When, however, the sleeve is slid rearwardly, so that it engages the end 13, the eye 12 may not be removed by reason of the fact that the sleeve prevents such removal. It will be observed that movement through the water in a direction usually effected in the employment of lures, will cause the sleeve 22 to move farther rearward more firmly closing the end 13 and thereby preventing the accidental removal of the attaching member. Furthermore the tension placed on the sleeve 22 by the end 13^A will tend to prevent shifting of the sleeve.

A combined casting line attaching and weed prong member is provided, consisting of a section of wire provided centrally with a loop 23. The portions of the wire adjacent to the loop are in contact and are provided with loop bends 25 encircling the attaching bar 18 and pivotal thereon. These ends are continued rearwardly and downwardly through the opening formed by the spaced portions 17 and 19 and shoulders 16 and 20, forming weed prongs 26, which are slightly curved as indicated. The loop 23 as hereinbefore stated is adapted for the reception of the casting line. It will be seen that strain placed upon this loop will cause the weed prongs to engage the shoulders 16 and 20 as at 27, thereby properly positioning the prongs. When the prongs are properly positioned the loop 23 is preferably alined with the attaching member in order that the strain may be placed thereon in a straight line. It will be obvious that the weed prongs may be shifted as desired when the lure is held in the hand. thereby permitting ready handling of the lure for straightening of the hooks and similar purposes, and it will likewise be obvious that such operations may be performed without interference by the weed prongs. When, however the line and lure are cast, the weed prongs immediately assume the proper position when strain is placed upon the line.

As many obvious changes are possible in the shape, size, and general arrangement without in any manner departing from the spirit of my invention, I do not limit myself to the specific construction, hereinbefore set forth, except as so limited by the subjoined claims.

Having now described my invention, what I claim is:

1. The combination with a fish lure having a line attachment eye, of a quick detachable member adapted to be mounted in said eye and provided with weed prongs.

2. The combination with a fish lure provided with a line attaching eye of weed prongs and a quick detachable member for connecting said weed prongs to the lure, embodying a member provided at its rear end with a loop adapted to receive the line attaching eye and at its forward end with a cross bar upon which said weed prongs are mounted.

3. The combination with a fish lure provided with a line attaching eye of a quick detachable member adapted to be mounted in said eye and provided at its free end with weed prongs.

4. The combination with a fish lure provided with a line attaching eye of a quick detachable member adapted to be mounted in said eye and provided at its free end with a cross bar and a member pivotally mounted on said cross bar and embodying weed prongs and a line attaching eye.

5. The combination with a fish lure provided with a line attaching eye of a quick detachable member adapted to be mounted in said eye and provided at its free end with a cross bar, a member pivotally mounted upon said cross bar and embodying weed prongs and a line attaching eye and shoulders formed on said quick detachable member and limiting the movement of the weed prongs in one direction.

6. The combination with a fish lure provided with a line attaching eye of weed prongs and a quick detachable member for connecting said weed prongs to the lure embodying a pair of slightly spaced parallel central portions each provided at its ends with offset bends, one set of said bends forming an attaching loop adapted to receive the line attaching eye of the lure and the other set of bends providing an attaching bar adapted for the reception of said weed prongs, one of said central portions being formed in two sections, and a keeper slidably mounted upon said central portions.

7. The combination with a fish lure having a line attachment eye, of a quick detachable member adapted to be mounted in said eye and provided with weed prongs, said weed prongs embodying a line attaching eye, a strain of the line attached to the line attaching eye of said prongs operably positioning said weed prongs.

In testimony whereof I hereunto affix my signature.

SAMUEL J. BROWN.